UNITED STATES PATENT OFFICE.

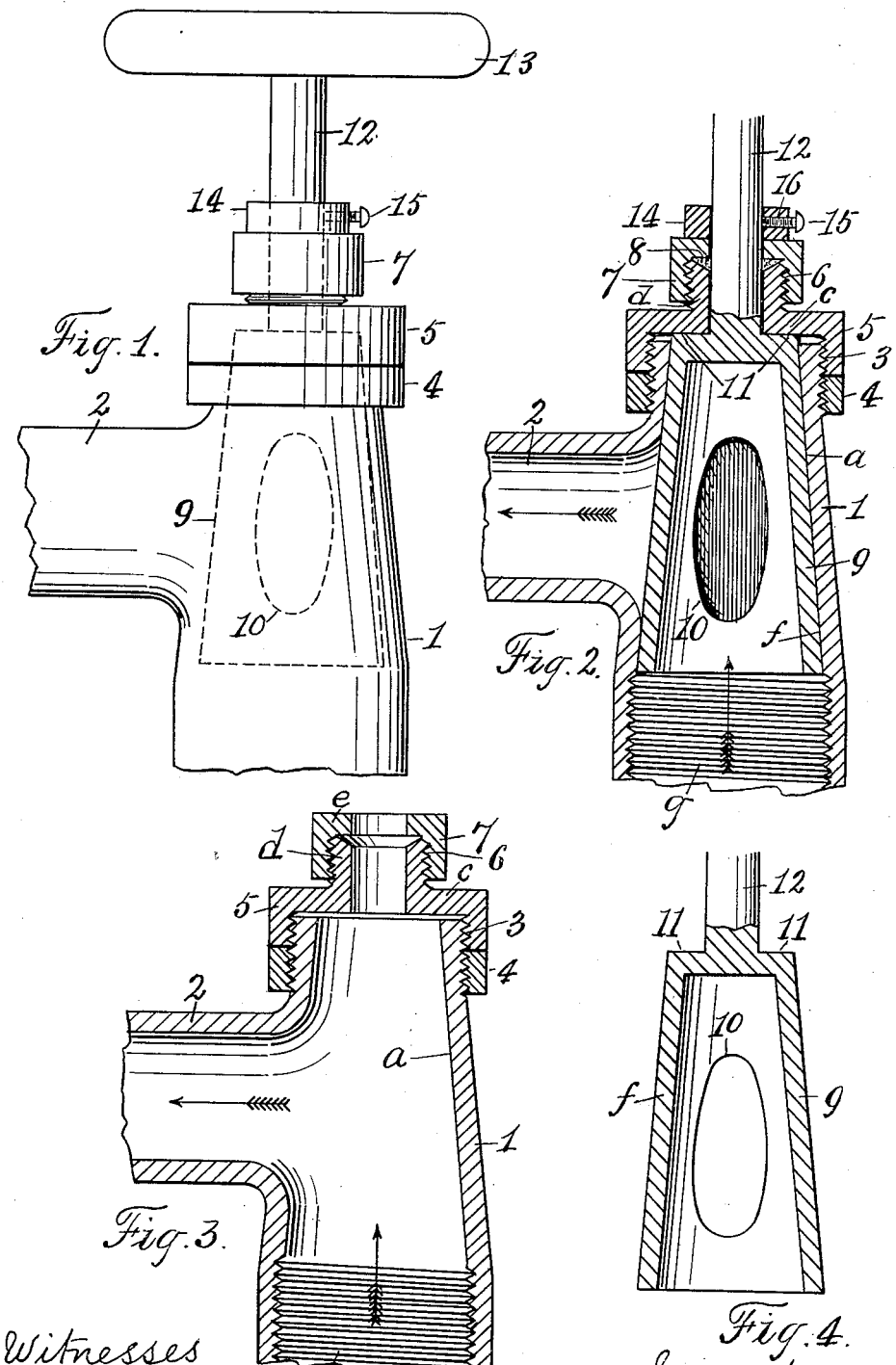

MELBOURNE WALKER, OF FLORENCE, ONTARIO, CANADA.

VALVE.

1,094,688.        Specification of Letters Patent.        Patented Apr. 28, 1914.

Application filed May 10, 1911.    Serial No. 626,397.

*To all whom it may concern:*

Be it known that I, MELBOURNE WALKER, a subject of the King of Great Britain, and a resident of the village of Florence, in the county of Lambton, in the Province of Ontario, Canada, have invented a new, useful, and Improved Valve, of which the following is a specification.

This invention relates to a device which controls a passage to regulate the flow or supply of steam, water, oil, gas or any fluid passing through said passage.

It consists of a body with a tapered hole formed longitudinally through it and with a lateral port or ports about midway of the sides. Fitted into this tapered hole is a tapered plug extending through the body and reduced to a stem and projecting farther with hand wheel for operation. This tapered plug has a hole centrally and longitudinally formed in it with two lateral ports that are directly opposite the lateral port or ports in the body so that when operated they turn to or from the ports in the body. On the outer end of the body is a cap nut and a jam nut, which permits the stem on the tapered plug to pass through until the shoulder on the plug abuts against the cap nut. This cap nut is to prevent the plug being pushed or pressed too tightly into the body under heavy pressure which would cause the plug to become stuck in the body. This cap nut can be adjusted to let the plug enter the tapered hole in the body until it is steam tight, and yet not tight enough to stick under the heaviest pressure; and it also consists of the improved construction and novel combination of parts of the same as will be hereinafter first fully set forth and described and then pointed out in the claims. Reference being had to the accompanying drawings forming part of this specification wherein:

Figure 1 is a side view of a valve embodying my invention. Fig. 2 is a vertical sectional view of same. Fig. 3 is a vertical cross sectional view of the body and attachments. Fig. 4 is a vertical cross section of the tapered plug partly in section.

In the accompanying drawings, 1 indicates a body formed hollow or with the chamber, *a*, and tapered longitudinally on the inside, as shown, and this body is formed with a port or ports 2.

3 is a screw thread formed on the outer end of the body 1, as shown.

4 is a jam nut which is first turned or screwed on the screw thread 3 on the outside of the hollow body 1, as shown, and 5 is a cap nut formed with an inturned portion, *c*, and with a neck portion, *d*, which is formed with a screw thread 6 on the outside, and this cap nut 5 is also turned or screwed on the screw thread 3 of the hollow body 1, all as shown.

7 is a packing nut formed with an inturned end, *e*, which packing nut 7 is turned or screwed on the screw thread 6 on the outside of the portion, *d*, of the cap nut 5.

8 is a packing material inserted between the inturned portion, *e*, of the packing nut 7 and the portion, *d*, of the cap nut 5, all as shown.

9 indicates a plug tapered on the outside as shown at *f*, and formed with the ports 10. These ports 10 are opposite one another in the sides of the tapered plug 9 for the purpose of balancing the pressure in said plug 9, because if a single port 10 was used in this plug 9 there would be a lateral pressure opposite said single port, and therefore wear the tapered face, *f*, of the plug 9 and the tapered face, *a*, of the body 1 out of true or round and thereby cause them to leak.

11 indicates a shoulder formed on the end of the tapered plug 9, 12 is the stem of the tapered plug 9, and 13 is a handle which is employed as a convenient means for turning said tapered plug 9; said stem 12 is fitted to and extends through the cap nut 5, the packing nut 7 and collar 14, all as shown.

14 indicates a collar which encircles the stem 12 above the inturned end, *e*, of the packing nut 7, and said collar 14 is held in the position to which it is adjusted by the set screw 15 extending through the hole 16 and against the stem 12.

The operation is as follows: The end of the tapered plug 9 extends slightly through the hollow body 1, as shown in Fig. 2, and to this extending end of the plug 9 is the stem 12, which stem 12 extends up through the cap nut 5, packing nut 7 and collar 14, to all of which said stem 12 is fitted where it passes through said parts, and to further make this joint between the inturned end, *e*, of the packing nut 7 and the end, *d*, of the cap nut 5 steam tight, a packing 8 is inserted between the adjacent inturned end, *e*, of the packing nut 7 and the end, *d*, of cap nut 5.

The source of supply, not shown, which supplies the water, steam, oil, air, gas or other fluid, is secured to the screw thread, g, of the body 1, but this source of supply may be attached to said body 1 by a screw thread or other suitable means. The steam, for instance, if steam is used, enters the tapered plug 9 as shown by arrows, from the source of supply, and exerts a pressure on said plug 9 so that the longitudinal taper, f, on the outside of said plug 9, abuts tightly against the longitudinal taper, a, on the inside of the body 1, thus causing the shoulder 11 of the plug 9 to abut against the inner face of the portion, c, of the cap nut 5.

The hand wheel 13 is used as a convenient means for turning the tapered plug 9 to bring one of the ports 10 opposite the port 2 in the body 1. When so adjusted, the steam, water, oil, gas or other liquid enters the tapered plug 9 from the source of supply, as indicated by arrow, and passes through the port 10 in the tapered plug 9, and the port 2 in the body 1, and when the plug 9 is turned so that the port 10 is not opposite the port 2 this passage is entirely closed.

In cases where high pressure is used, the longitudinal taper, f, on the outside of the plug 9 may be forced too tightly into the longitudinal taper, a, on the inside of the body 1, and make the plug 9 hard to operate in the body 1; again in cases of low pressure this longitudinal taper, f, on the outside of the plug 9 may not be pressed tight enough into the longitudinal taper, a, in the body 1, in which case this device would be liable to leak. So that this invention also consists of a cap nut 5 provided with an inturned portion, c, which portion c, fits loosely around the stem 12 and is adapted to abut against the shoulder 11 on the plug 9, and the packing nut 7 abuts against the collar 14, for the purpose of adjusting the longitudinal taper f, of the plug 9 looser or tighter as required, so that said plug 9 will not work too tight nor too loose in said body 1. This cap nut 5 works on a screw thread 3 on the outside of the body 1, so that by screwing it on the body 1, the shoulder, c, of said nut will abut against the shoulder 11 on the plug 9 to relieve it under high pressure, or by unscrewing it, and raising the collar 14, the longitudinal taper, f, of the plug 9 will be raised against the longitudinal taper, a, of the body 1, so that it will not leak under low pressure.

The jam nut 4 being screwed on the screw thread 3 on the outside of the body 1, serves, when tightened against the cap nut 5, to prevent the latter from turning and to rigidly set the cap nut 5 where required on the body 1.

If the adjacent faces, f, and, a, of the plug 9 or body 1 should wear, which they might do slightly, it may be readily taken up by loosening the cap nut 5 and adjusting the longitudinal taper, f, on the outside of the plug 9, slightly in the longitudinal taper, a, on the inside of the body 1; the collar 14 acting on the packing nut 7 prevents the plug 9 from falling down or back in the body 1, when there is no pressure on said plug 9.

The object of tapering the outside of the plug 9 and the inside or adjacent side, a, of the body 1 is to take up any possible wear of these parts.

In many valves in ordinary use the pressure is applied laterally causing the wearing parts to wear untrue or out of round which causes them to leak, but in the present device there is no lateral pressure as the pressure is applied endwise or longitudinally to the plug, causing the surfaces of the wearing parts to seat themselves perfectly automatically and thus prevent leakage. By my construction, means is provided at the smaller end of the plug 9 for controlling the axial position of the plug 9 relative to the body 1. If any wear of the plug 9 occurs, the plug may readily be adjusted to take up for said wear by simply loosening lock nut 4 and turning cap nut 5 so as to move the stem outwardly, to maintain a close engagement between seat or shoulder 11 and the cap nut 5, and then tightening the lock nut 4, thus moving the plug and end cap axially as a unit. As a result a device constructed as described provides a full waterway, one that will stand any pressure, one that will not hammer or vibrate when turning off or on, one so constructed that sand or any other substance will pass through without injuring any of the working parts, one that has no leather seat to wear out with the action of the water, one therefore that will be perfectly noiseless, one that never leaks and a device constructed as described forms one that will be simple, strong, durable and inexpensive to make and efficient in practical use.

Having thus described my invention, I claim:

1. In valve control, a valve body, a valve member for controlling the passage-way through the body, said body and valve member being relatively adjustable axially of the member to take up for wear, and means at one end of the member for controlling the axial position of the member in both directions relative to the body, said means comprising a cap, a seat therefor, said cap and seat being each mounted on the valve body and independently adjustable relative thereto, said cap being adapted to contact with and form a support for the plug during endwise pressure, and adjustable means carried by the valve stem for positioning the valve member relative to said cap.

2. In valve control, a valve body, a valve member for controlling the passage way through the body, said body and valve member being relatively adjustable axially of the member to take up for wear, and means at one end of the member for controlling the axial position of the member in both directions relative to the body, said means comprising a cap having a seat adapted to contact with the end of the plug, a threaded stem carried by said cap, a packing nut engaging said threaded stem, a lock-nut for said cap nut threaded onto the body, and a locking collar on the valve stem engaging said packing nut.

In testimony whereof, I have signed in the presence of the two undersigned witnesses.

MELBOURNE WALKER.

Witnesses:
P. J. EDMUNDS,
E. BEDFORD.